US011645801B2

(12) United States Patent
Guo et al.

(10) Patent No.: US 11,645,801 B2
(45) Date of Patent: May 9, 2023

(54) METHOD FOR SYNTHESIZING FIGURE OF VIRTUAL OBJECT, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Hanqi Guo, Beijing (CN); Tianshu Hu, Beijing (CN); Mingming Ma, Beijing (CN); Zhibin Hong, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 27 days.

(21) Appl. No.: 17/348,452

(22) Filed: Jun. 15, 2021

(65) Prior Publication Data
US 2021/0312685 A1    Oct. 7, 2021

(30) Foreign Application Priority Data
Sep. 14, 2020  (CN) .......................... 202010963014.9

(51) Int. Cl.
G06T 17/00  (2006.01)
G06T 15/04  (2011.01)
(Continued)

(52) U.S. Cl.
CPC ................ G06T 13/40 (2013.01); G06T 7/73 (2017.01); G06T 15/04 (2013.01); G06T 17/20 (2013.01);
(Continued)

(58) Field of Classification Search
CPC .......... G06T 15/04; G06T 13/40; G06T 7/73; G06T 17/20; G06T 2207/20221;
(Continued)

(56) References Cited

U.S. PATENT DOCUMENTS 6,072,496 A * 6/2000 Guenter ............... G06V 40/166
345/419
7,168,953 B1 * 1/2007 Poggio .................... G06T 13/40
704/E21.02
(Continued)

FOREIGN PATENT DOCUMENTS

JP    H08233556 A    9/1996
JP    2020071851 A   5/2020
WO   2016161553 A1  10/2016

OTHER PUBLICATIONS

Karras et al., Audio-Driven Facial Animation by Joint End-to-End Learning of Pose and Emotion, 2017 (Year: 2017).*
(Continued)

*Primary Examiner* — Phong X Nguyen
(74) *Attorney, Agent, or Firm* — Osha Bergman Watanabe & Burton LLP

(57) ABSTRACT

A method for synthesizing a figure of a virtual object includes: obtaining a figure image of the virtual object, and original face images corresponding to a speech segment; extracting a first face key point of the face of the virtual object, and a second face key point of each of the original face images; processing the first face key point to generate a position and posture information of a first three-dimensional 3D face; processing each second face key point to generate vertex information of a second 3D face; generating a target face image corresponding to each original face image based on the position and the posture information of the first 3D face and the vertex information of each second 3D face; and synthesizing a speaking figure segment of the virtual object, corresponding to the speech segment, based on the figure image of the virtual object and each target face image.

20 Claims, 12 Drawing Sheets

(51) Int. Cl.
  *G06T 13/40* (2011.01)
  *G06T 7/73* (2017.01)
  *G06T 17/20* (2006.01)
  *G06V 40/16* (2022.01)

(52) U.S. Cl.
  CPC .. *G06V 40/171* (2022.01); *G06T 2207/20221* (2013.01); *G06T 2207/30201* (2013.01)

(58) Field of Classification Search
  CPC ... G06T 2207/30201; G06T 2219/2021; G06T 17/00; G06T 19/20; G06T 2200/04; G06T 5/50; G06T 7/70; G06V 40/171; A63F 13/655; G10L 15/04; H04N 21/4307
  See application file for complete search history.

(56) References Cited

U.S. PATENT DOCUMENTS

| | | | | |
|---|---|---|---|---|
| 9,479,736 | B1* | 10/2016 | Karakotsios | H04N 5/265 |
| 11,295,502 | B2* | 4/2022 | Fang | G06V 40/28 |
| 11,403,800 | B1* | 8/2022 | Prokudin | G06V 40/103 |
| 11,553,969 | B1* | 1/2023 | Lang | G06T 3/4007 |
| 2009/0096796 | A1 | 4/2009 | Brown et al. | |
| 2012/0069028 | A1* | 3/2012 | Bouguerra | H04L 51/046 |
| | | | | 715/810 |
| 2012/0130717 | A1* | 5/2012 | Xu | G06T 13/40 |
| | | | | 345/473 |
| 2012/0280974 | A1* | 11/2012 | Wang | G10L 21/10 |
| | | | | 345/419 |
| 2015/0125049 | A1* | 5/2015 | Taigman | G06V 40/172 |
| | | | | 382/118 |
| 2015/0254816 | A1* | 9/2015 | Carlson | G06T 5/005 |
| | | | | 382/131 |
| 2016/0110922 | A1* | 4/2016 | Haring | G06T 13/40 |
| | | | | 345/633 |
| 2017/0069124 | A1* | 3/2017 | Tong | G06T 17/20 |
| 2019/0082211 | A1* | 3/2019 | Vats | G06T 7/215 |
| 2019/0095775 | A1 | 3/2019 | Lembersky et al. | |
| 2019/0197755 | A1* | 6/2019 | Vats | G06T 13/80 |
| 2020/0074153 | A1* | 3/2020 | Yang | G06V 10/757 |
| 2020/0151502 | A1* | 5/2020 | Huang | G06V 10/763 |
| 2020/0160613 | A1* | 5/2020 | Han | G06V 40/10 |
| 2021/0056348 | A1* | 2/2021 | Berlin | G06T 11/001 |
| 2021/0059760 | A1* | 3/2021 | Tseng | G06T 19/006 |
| 2021/0312685 | A1* | 10/2021 | Guo | A63F 13/655 |
| 2022/0215830 | A1* | 7/2022 | Jawahar | G10L 15/063 |
| 2022/0284896 | A1* | 9/2022 | Poltorak | G10L 15/1815 |

OTHER PUBLICATIONS

Sakurai et al., Synthesis of Expressive Talking Heads from Speech with Recurrent Neural Network, 2018 (Year: 2018).*
Tian et al., AUDIO2FACE: Generating Speech/Face Animation From Single Audio With Attention-Based Bidirectional LSTM Networks, 2019 (Year: 2019).*
Extended European Search Report issued in corresponding EP Application 21178930.0 dated Dec. 9, 2021 (9 pages).
Nunes, Jose et al. "Talking avatar for web-based interfaces" EUROCON—International Conference on Computer as a Tool (EUROCON), 2011 IEEE, Apr. 27-29, 2011, Lisbon Portugal, IEEE, Piscataway, NJ, Apr. 27, 2011, pp. 1-4 (4 pages).
Office Action issue in corresponding JP Application No. 2021-149542 with English translation dated Sep. 27, 2022 (8 pages).
Isono, K. et al. "Euclidean Structure from Uncalibrated Images Using Fuzzy Domain Knowledge: Application to Facial mage Synthesis" Fuzzy Domain Knowledge, Aug. 1999, vol. 40, No. 8, pp. 3198-3208 (11 pages).

* cited by examiner

METHOD FOR SYNTHESIZING FIGURE OF VIRTUAL OBJECT, ELECTRONIC DEVICE, AND STORAGE MEDIUM

CROSS-REFERENCE TO RELATED APPLICATION

This application claims priority to Chinese Patent Application No. 202010963014.9, filed on Sep. 14, 2020, the entire contents of which are incorporated herein by reference.

TECHNICAL FIELD

The disclosure relates to the field of artificial intelligence (AI), specifically to the field of computer vision and deep learning (DL), and particularly to a method for synthesizing a figure of a virtual object, an electronic device, and a storage medium.

BACKGROUND

A virtual object is the generating human-shaped video images by a combination of digital image, artificial intelligence (AI), and other technologies, which is widely applicable to the field of virtual object speech broadcast. That is, the virtual object may be made to reflect a speaking mouth shape in the form of normal human speaking.

In the related art, coordinate relationships of key points of a mouth shape are extracted from a mouth image, and coordinates of key points of a mouth region in a virtual object image corresponding to the virtual object are adjusted based on the coordinate relationships. Therefore, reflection of simulating human speaking through the mouth shape of the virtual object may be achieved.

However, the above fusion manner on the simulating human speaking through the mouth shape of the virtual object may imitate and map the coordinate relationships of key points of the mouth image to the virtual object image. On one hand, a mouth shape reflected in the virtual object image and a mouth shape reflected in the original mouth image may not correspond to the same expression speech in the same coordinate system; on the other hand, it may imitate and map the coordinate relationships of key points of the mouth image to the virtual object image, which completely loses information of the original mouth image and may not achieve the image fusion.

SUMMARY

According to a first aspect, a method for synthesizing a figure of a virtual object is provided, and includes: obtaining a figure image of the virtual object, and original face images corresponding to a speech segment, in which the figure image includes a face of the virtual object; extracting a first face key point of the face of the virtual object, and a second face key point of each of the original face images; processing the first face key point based on a preset algorithm, to generate a position and posture information of a first three-dimensional 3D face corresponding to the face of the virtual object; processing each second face key point based on a preset algorithm, to generate vertex information of a second 3D face corresponding to each original face image; generating a target face image corresponding to each original face image based on the position and the posture information of the first 3D face and the vertex information of each second 3D face; and synthesizing a speaking figure segment of the virtual object, corresponding to the speech segment, based on the figure image of the virtual object and each target face image.

According to a second aspect, an electronic device is provided, and includes: at least one processor; and a memory communicatively coupled to the at least one processor; in which, the memory is configured to store instructions executable by the at least one processor, and when the instructions are executed by the at least one processor, the at least one processor is caused to perform the method for synthesizing the figure of the virtual object as described above.

According to a third aspect, a non-transitory computer-readable storage medium storing computer instructions is provided, in which the computer instructions are configured to enable a computer to perform the method for synthesizing the figure of the virtual object as described above.

It should be understood that the content described in this section is not intended to identify the key or important features of the embodiments of the disclosure, nor is it intended to limit the scope of the disclosure. Additional features of the disclosure will be easily understood by the following description.

BRIEF DESCRIPTION OF THE DRAWINGS

The accompanying drawings are used to understand the solution better, and do not constitute a limitation on the application, in which.

DETAILED DESCRIPTION

The following describes the exemplary embodiments of the disclosure with reference to the accompanying drawings, which includes various details of the embodiments of the disclosure to facilitate understanding and shall be considered merely exemplary. Therefore, those of ordinary skill in the art should recognize that various changes and modifications can be made to the embodiments described herein without departing from the scope and spirit of the disclosure. For clarity and conciseness, descriptions of well-known functions and structures are omitted in the following description.

Figure 1:
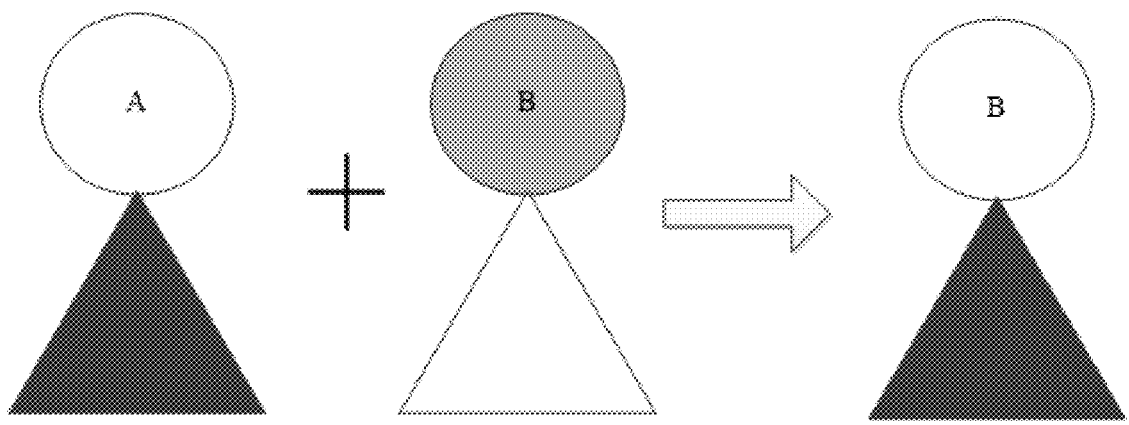
FIG. 1 is a schematic diagram illustrating a scenario of synthesizing a figure of a virtual object according to a first embodiment of the disclosure.

In order to solve technical problems in the related art that there is no fusion reflection among the figure image of the virtual object and the original mouth images, and real mouth shapes of the original mouth images may not be reflected when fusion, the disclosure proposes a multi-posture fusion solution of the figure image of the virtual object and the original mouth images. The original mouth image may be adjusted to be under the corresponding posture of the figure image of the virtual object, and the image fusion may be performed based on a uniform posture, which achieves fusion effect. In a possible artificial intelligence (AI) scenario, as illustrated in FIG. 1, a face figure A of a virtual object is changed into a face figure B corresponding to the original mouth image. Since a posture of B is adjusted based on a posture of A, the fusion effect is natural in combination with processing technologies related to computer vision, to ensure the fused figure of the virtual object may truly reflect mouth shapes when B speaks.

A method and an apparatus for synthesizing a figure of a virtual object, an electronic device, and a storage medium, provided in embodiments of the disclosure, are described with reference to the accompanying drawings. The method and the apparatus for synthesizing the figure of the virtual object, the electronic device, and the storage medium in embodiments of the disclosure may be applicable to reality simulation in artificial intelligence (AI) scenarios. For example, a figure of a virtual object A is controlled to display speeches in the form of reflecting mouth shapes of B. Therefore, the fused figure of the virtual object may not only retain a body posture of A, but also reflect the mouth shapes of B when speaking.

Figure 2:
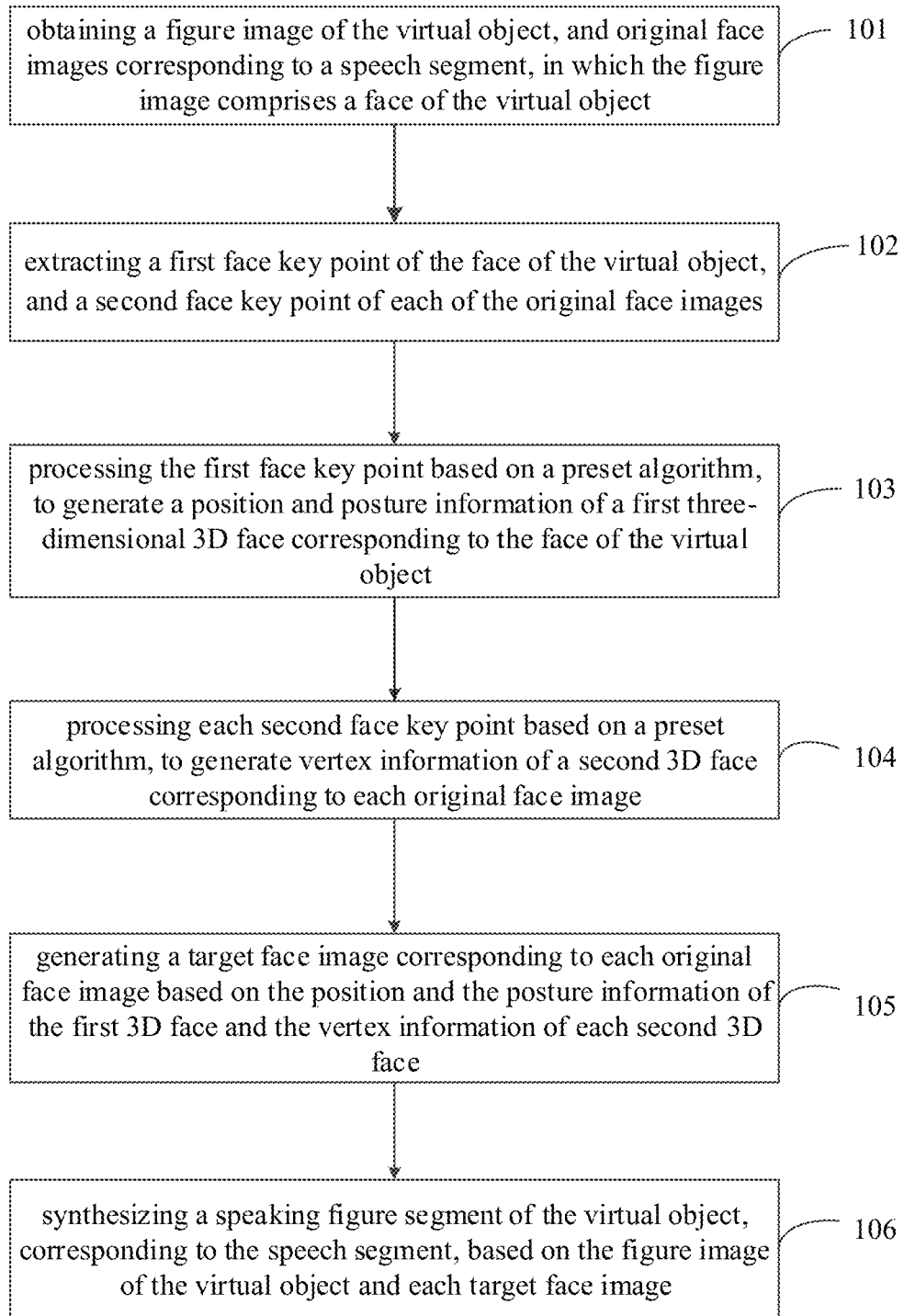
FIG. 2 is a flowchart illustrating a method for synthesizing a figure of a virtual object according to a second embodiment of the disclosure.
Figure 3:
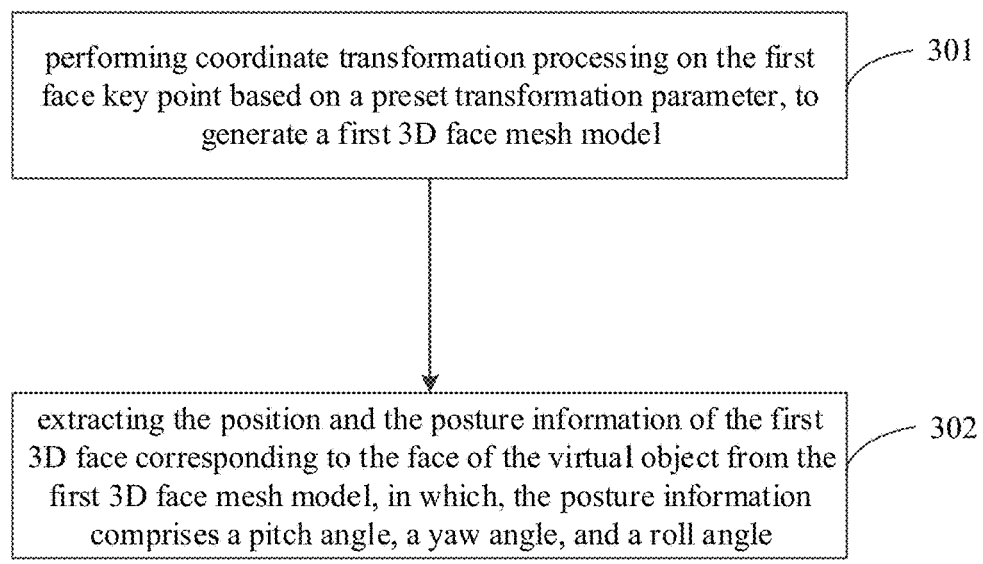
FIG. 3 is a flowchart illustrating a method for synthesizing a figure of a virtual object according to a third embodiment of the disclosure.

In detail, FIG. 2 is a flowchart illustrating a method for synthesizing a figure of a virtual object according to some embodiments of the disclosure. As illustrated in FIG. 3, the method may include the following.

At block 101, a figure image of the virtual object, and original face images corresponding to a speech segment are obtained, in which the figure image includes a face of the virtual object.

It is understandable that, the figure image of the virtual object, which includes the face of the virtual object, in some embodiment of the disclosure, may be a background image in a fusion scenario. The figure image of the virtual object may further include a body part of the virtual object in addition to the face of the virtual object. The figure image of the virtual object may be a person image, an animal image, as well as a scenery image, which will not be limited herein.

In addition, the original face images corresponding to the speech segment may be obtained as follows. A video stream that collects speeches of human beings which express the speech segment in real time may be obtained, and the original face images may be obtained by extracting image frames from the video stream. Or, a plurality of deep learning (DL) models corresponding to a plurality of standard mouth shapes may be established based on experimental data in advance. The input of the DL model may be the standard mouth image and the speech segment, and the output of the DL model may be a plurality of mouth images corresponding to the speech segment. Therefore, in some embodiments, a current original face image is obtained, and the mouth image feature of the current original face image is compared with mouth image features of the plurality of preset standard mouth images, and the target standard mouth image that is most similar is determined from the plurality of preset standard mouth images based on comparison results, and the current original face image and the corresponding speech segment may be input to a DL model corresponding to the target standard mouth image, so that the original face images may be obtained based on the output of the DL model. Therefore, the manner provides technical support in order to satisfy requirements in more scenarios without collecting images in real time. For example, when a current original face image of the user A is obtained, it may may reflect the animation effect of the corresponding speech segment expressed by the user A in the figure of the virtual object.

At block 102, a first face key point of the face of the virtual object, and a second face key point of each of the original face images are extracted.

The first face key point and the second face key point may be understood as key points of the corresponding face region, which may include a plurality of key points that may define a contour of a face shape such as a canthus, a tip of a nose, corners of a mouth, a chin.

At block 103, the first face key point is processed based on a preset algorithm, to generate a position and posture information of a first three-dimensional 3D face corresponding to the face of the virtual object.

In some embodiments, in order to ensure naturalness of fusion effect, a position and posture information of the first face key point may be collected so that the original face image is uniformed to be under this position and posture.

The position of the first 3D face may include a coordinate position of a key point of the face in the image and the like, and the posture information may include a pitch angle, a yaw angle, a roll angle, and the like.

It should be noted that, under different application scenarios, the preset algorithms of processing the first face key point to generate the position and the posture information of the first 3D face corresponding to the face of the virtual object may different, illustrated in the following examples.

Example One

In the example, as illustrated in FIG. 3, processing the first face key point based on the preset algorithm, to generate the position and the posture information of the first 3D face corresponding to the face of the virtual object may include the following.

At block 301, coordinate transformation processing is performed on the first face key point based on a preset transformation parameter, to generate a first 3D face mesh model.

In an actual execution process, the face information under the world coordinate system is transformed to the figure image of the virtual object, which relates to internal parameters and external parameters of a camera. Therefore, the transformation parameter in some embodiments may be understood as internal parameters and external parameters of the camera, or algorithm parameters reflecting internal parameters and external parameters of the camera, in which, internal parameters and external parameters of the camera may be obtained based on a checkerboard calibration method of Zhang Zhengyou.

Figure 4:
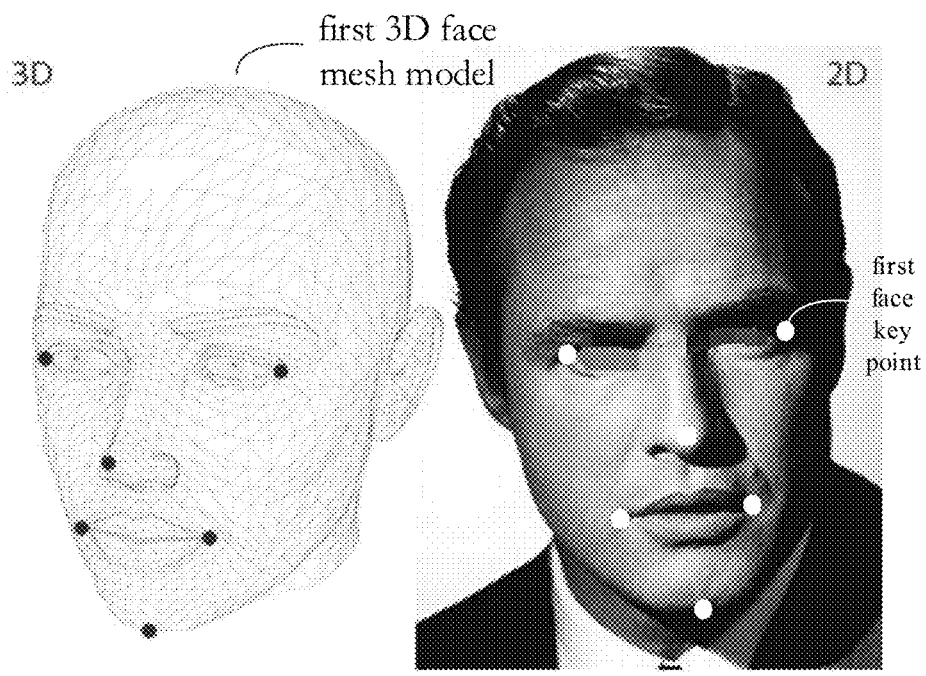
FIG. 4 is a schematic diagram illustrating a scenario of constructing a first 3D face mesh model according to a fourth embodiment of the disclosure.

In some embodiments, the coordinate transformation processing is performed on the first face key point based on the preset transformation parameter, to generate the first 3D face mesh model, that is, as illustrated in FIG. 4, the first 2D face key point may be restored to obtain the first 3D face mesh model.

At block 302, the position and the posture information of the first 3D face corresponding to the face of the virtual object are extracted from the first 3D face mesh model, in which, the posture information includes a pitch angle, a yaw angle, and a roll angle.

Figure 5:
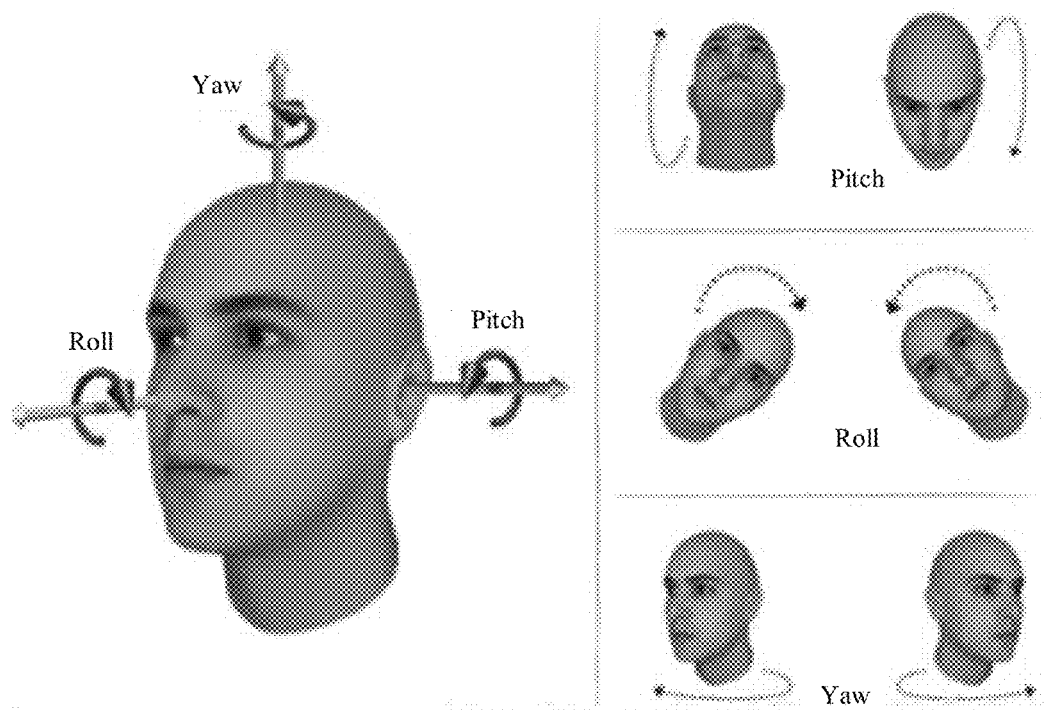
FIG. 5 is a schematic diagram illustrating posture information according to a fifth embodiment of the disclosure.

In some embodiments, the position and the posture information of the first 3D face corresponding to the face of the virtual object may be extracted in the first 3D face mesh model, so as to achieve a multi-posture grasp for the first 3D face mesh model. As illustrated in FIG. 5, the posture information includes three Euler angles of pitch, yaw, and roll, which are the pitch angle, the yaw angle, and the roll angle respectively. The pitch angle, the yaw angle, and roll angle may be solved based on a rotation matrix. In detail, it is assumed that the spatial position relation matrix of the object relative to the camera is represented by T, and the spatial posture relation matrix of the object relative to the camera is represented by R. A rotation matrix of the pixel coordinate system to the world coordinate system is calculated based on R and T. The above posture information may be obtained based on transformation calculation of 2D coordinates and 3D coordinates of the first face key points through the rotation matrix.

Example Two

In the example, structured light is projected to the face of the virtual object to obtain a structured light image modulated by the face of the virtual object, and the structured light image is demodulated to obtain depth information corresponding to the first face key point of the face of the virtual object, and the first 3D face mesh model corresponding to the first face key point may be constructed based on the depth information and the coordinate information of the first face key point, so that the corresponding posture information may be obtained through model analysis of the first 3D face mesh model. For example, a 3D coordinate system (including three directions of x, y, z) is constructed in advance, and the first 3D face mesh model is placed in the coordinate system to collect posture information (three displacements in three directions of x, y, z may be read as posture information).

At block 104, each second face key point is processed based on a preset algorithm, to generate vertex information of a second 3D face corresponding to each original face image.

Figure 6:
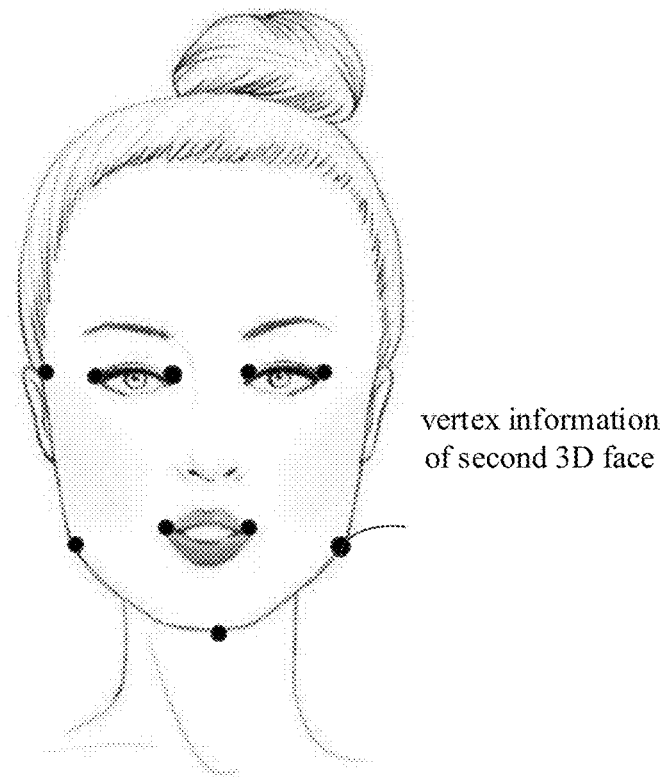
FIG. 6 is a schematic diagram illustrating vertex information of a second 3D face according to a sixth embodiment of the disclosure.

The vertex information of the second 3D face may be understood as, as illustrated in FIG. 6, contour information corresponding to the original face image, and the contour information further includes an irrelevant shape contour and a relative position except the face contour. It also be understood that, a contour image of the face in the original face image may be obtained based on the vertex information of the second 3D face.

In some embodiments, in order to present the information of the original face image in the figure image of the virtual object, the vertex information of the second 3D face corresponding to each original face image is obtained, so as to achieve that a face figure of the original face image may be represented on the face of the figure image of the virtual object.

It should be noted that, in different scenarios, the manners of processing each second face key point based on the preset algorithm, to generate the vertex information of the second 3D face corresponding to each original face image are different, as illustrated in the following examples.

Example One

In the example, in order to extract the vertex information of the second 3D face more precisely, the corresponding vertex information of the second 3D face is determined in a 3D model.

Figure 7:
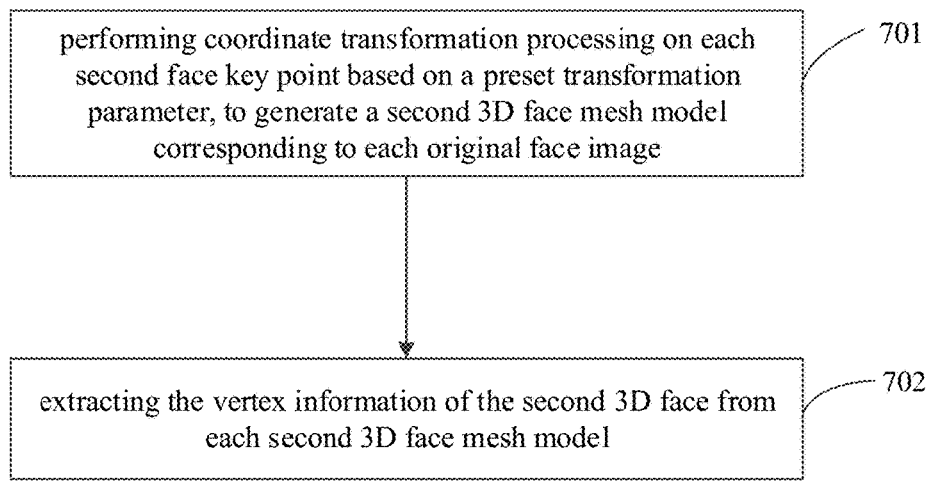
FIG. 7 is a flowchart illustrating a method for synthesizing a figure of a virtual object according to a seventh embodiment of the disclosure.

As illustrated in FIG. 7, processing each second face key point based on the preset algorithm, to generate the vertex information of the second 3D face corresponding to each original face image may include the following.

At block 701, coordinate transformation processing is performed on each second face key point based on a preset transformation parameter, to generate a second 3D face mesh model corresponding to each original face image.

In an actual execution process, the face information under the world coordinate system is transformed to the figure image of the virtual object, which relates to internal parameters and external parameters of a camera. Therefore, the transformation parameter in some embodiments may be understood as internal parameters and external parameters of the camera, or algorithm parameters reflecting internal parameters and external parameters of the camera, in which, internal parameters and external parameters of the camera may be obtained based on a checkerboard calibration method of Zhang Zhengyou.

In some embodiments, the coordinate transformation processing is performed on each second face key point based on the preset transformation parameter, to generate the second 3D face mesh model corresponding to each original face image, that is, the second 2D face key point may be restored to obtain the second 3D face mesh model.

At block 702, the vertex information of the second 3D face is extracted from each second 3D face mesh model.

In some embodiments, the vertex information of the second 3D face is extracted from each second 3D face mesh model, for example, a point with obvious step changes may be determined as a vertex of the second 3D face based on depth information of the second 3D face mesh model, and coordinate information of the point may be taken as the vertex information of the second 3D face.

Example Two

In the example, each original face image is transformed to a binary image, and the corresponding second face key point is labeled in the binary image. A noise interference contour line in the binary image is removed based on the second face key point, that is, the contour line that does not contain the second face key point is removed. A key point is sampled from the remaining contour lines to obtain a vertex of the second 3D face. A slope difference among each sampling key point and left and right adjacent key points may be calculated in the remaining contour lines, and the sampling key point with the slope difference greater than a certain value is determined as the vertex of the second 3D face.

At block 105, a target face image corresponding to each original face image is generated based on the position and the posture information of the first 3D face and the vertex information of each second 3D face.

In some embodiments, the vertex information of each second 3D face is controlled to make position adjustment based on the position and the posture information of the first 3D face, thus the target face image corresponding to each original face image is generated, and the posture and position of the target face image have been aligned with the figure image of the corresponding virtual object.

Figure 8:
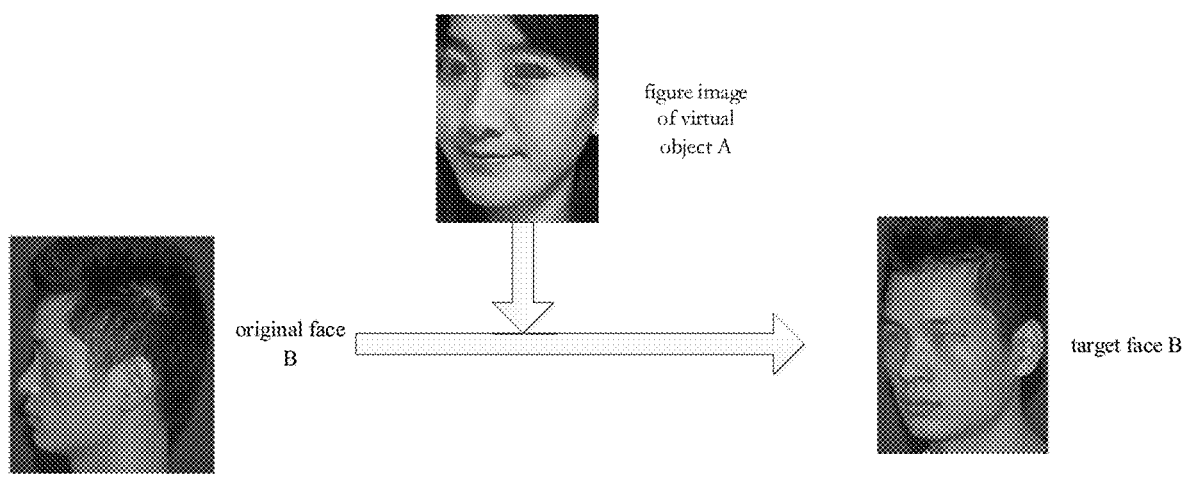
FIG. 8 is a schematic diagram illustrating a scenario of synthesizing a figure of a virtual object according to an eighth embodiment of the disclosure.

For example, as illustrated in FIG. 8, it is assumed that the position and the posture information of the first 3D face in the figure image of the virtual object A is illustrated (in 2D form), after the vertex information of each second 3D face of the original face B is adjusted, a target face B consistent with the position and the posture information of the first 3D face is obtained.

At block 106, a speaking figure segment of the virtual object, corresponding to the speech segment, is synthesized based on the figure image of the virtual object and each target face image.

When each target face image is obtained, the figure image of the virtual object and each target face image are fused. Since the figure image of the virtual object has been aligned with each target face image in the 3D view, a face image having the same mouth shape with the target face image may be rendered in the figure image of the virtual object. Obviously, when the figure image of the virtual object and each target face image are fused, a speaking figure segment of the virtual object, corresponding to the speech segment, may be obtained.

Before the figure image of the virtual object and each target face image are fused, a size of each target face image may be adjusted, to achieve the same size with the face region of the figure image of the virtual object.

In some possible embodiments, projection transformation is performed on each target face image, to achieve 2D projection of the vertex information of the second 3D face corresponding to each target face image under the position and the posture of the figure image of the virtual object. In an actual fusion process, transparency of the coincidence point with the vertex information of the second 3D face in the figure image of the virtual object may be changed, to achieve mutual fusion. For example, the pixel transparency of the coincidence point corresponding to the contour line of face features of the target face image is set as 100%, so that the synthesized figure image of the virtual object reflects the face features of the target face image. For example, the pixel transparency of coincidence points in addition to the contour line of face features of the target face image is set as 0, so that the synthesized figure image of the virtual object reflects skin color information of the figure image of the virtual object, in which, the pixel transparency of the contour region of face features in the synthesized figure image of the virtual object may be set as 100%, so as to ensure the purity of the synthesized figure image of the virtual object.

In some possible embodiments, the face region of the figure image of the virtual object is replaced with the face region of the target face image to achieve fusing.

In summary, with the method for synthesizing the figure image of the virtual object provided in embodiments of the disclosure, the figure image of the virtual object and the original face images corresponding to the speech segment may be obtained, in which the figure image includes the face of the virtual object. The first face key point of the face of the virtual object and the second face key point of each of the original face images may be extracted. The first face key point may be processed based on the preset algorithm, to generate the position and the posture information of the first 3D face corresponding to the face of the virtual object. Each second face key point may be processed based on the preset algorithm, to generate the vertex information of the second 3D face corresponding to each original face image. The target face image corresponding to each original face image may be generated based on the position and the posture information of the first 3D face and the vertex information of each second 3D face. The speaking figure segment of the virtual object, corresponding to the speech segment, may be synthesized based on the figure image of the virtual object and each target face image. Therefore, the original face images may be adjusted to be under the posture and position of the figure of the virtual object for fusion, to improve a naturalness of the fusion images, and make the fusion images to truly restore the speaking figure of the original face images.

It should be understood that, the target face image restores the posture and position of the face of the virtual object. For example, the face of the virtual object is an aslant head, whatever posture of the face in the original face image is, it may be transformed to the target face image corresponding to the same aslant head.

In different application scenarios, generating the target face image corresponding to each original face image based on the position and the posture information of the first 3D face and the vertex information of each second 3D face may be different.

In some possible embodiments, projection transformation may be performed on the position and the posture information of the first 3D face and the vertex information of each second 3D face respectively based on a preset transformation algorithm, to generate a first target face image corresponding to each original face image.

It is understandable that, in some embodiments, the transformation algorithm for implementing the transformation between the face position and posture information and the coordination information may be pre-constructed, and the projection transformation is performed respectively on the position and the posture information of the first 3D face and the vertex information of each second 3D face based on the preset transformation algorithm. That is, the vertex information of the second 3D face in 3D space is projected to a 2D image space through the posture of the face of the virtual object, to obtain the new face image as the first target face image.

Of course, the texture of the obtained first target face image is blank, and texture rendering needs to be aligned to obtain a complete target face image. For example, texture information of the face of the virtual object is obtained by direct sampling, and the first target face image may be rendered based on the texture information. The rendered target face image is more close to the face of the virtual image.

Figure 9:
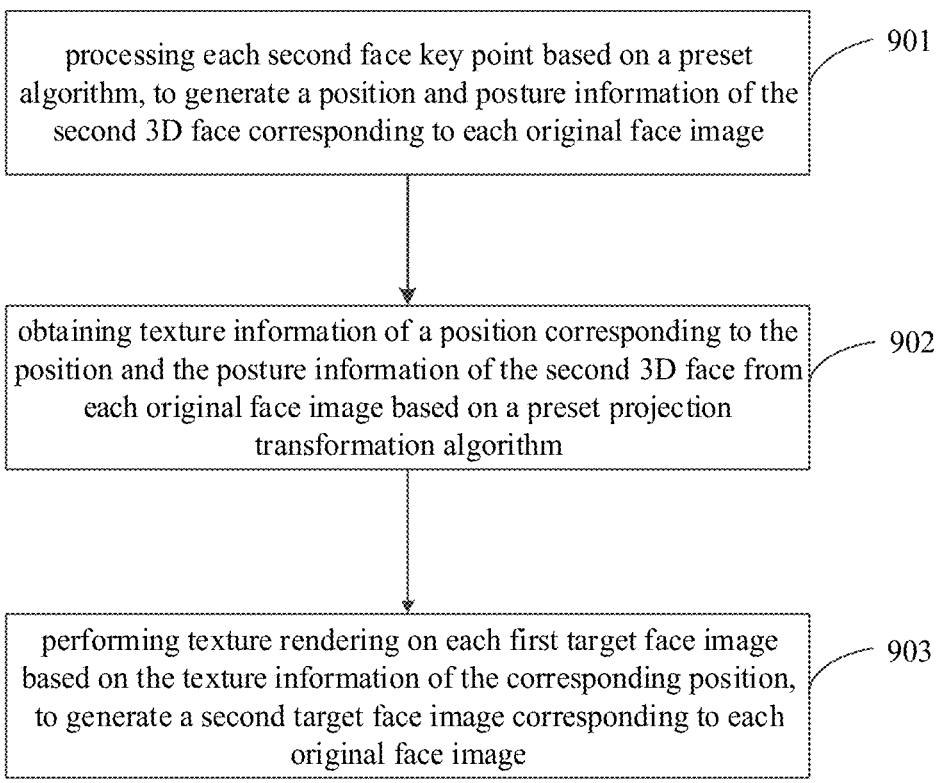
FIG. 9 is a flowchart illustrating a method for synthesizing a figure of a virtual object according to a ninth embodiment of the disclosure.

For another example, as illustrated in FIG. 9, texture rendering on the first target face image may include the following.

At block 901, each second face key point is processed based on a preset algorithm, to generate a position and posture information of the second 3D face corresponding to each original face image.

In some embodiments, the manner of obtaining the position and the posture information of the second 3D face may refer to the manner of obtaining the position and the posture information of the first 3D face, which will not be repeated herein.

At block 902, texture information of a position corresponding to the position and the posture information of the second 3D face is obtained from each original face image based on a preset projection transformation algorithm.

In some embodiments, when the position and the posture information of the second 3D face is obtained, texture information of the position corresponding to the position and the posture information of the second 3D face may be found from each original face image, for example, the position corresponding to the position and the posture information of the second 3D face is "tip of nose", and texture information corresponding to "tip of nose" is found from the original face image.

After the position and the posture information of the first 3D face is projected to a 2D image based on the preset projection transformation, the region including corresponding pixels in each original face image is taken as the texture information of the position corresponding to the position and the posture information of the second 3D face.

At block 903, texture rendering is performed on each first target face image based on the texture information of the corresponding position, to generate a second target face image corresponding to each original face image.

When the texture information is obtained in the 3D view, the position and the posture information of the second 3D face corresponding to the texture information may match the position and the posture information of the second 3D face mesh model corresponding to each first target face image, to determine texture information of each region of the second 3D face mesh model, further to determine the corresponding region of each region in each first target face image, and take the corresponding texture information as the texture information of the corresponding region. Texture rendering may be performed on each first target face image, to generate the second target face image corresponding to each original face image.

In some possible embodiments, the coordinate transformation processing is performed on each second face key point based on the preset transformation parameter, and the second 3D face mesh model corresponding to each original face image is generated. After that, the position and the posture information of the second 3D face mesh model is adjusted based on the position and the posture information of the first 3D face, and the vertex information of the second 3D face in the adjusted second 3D face mesh model is projected to obtain the corresponding first target face image, in which the process of texture rendering on the first target face image to generate the second target face image may refer to the above embodiments.

A texture value corresponding to the vertex in the original face image may be further obtained by sampling based on the projection coordinate of the vertex information of the second 3D face, that is, the corresponding texture value of the 2D planimetric position of the vertex through new posture projection transformation. The regions between vertexes is rendered by bilinear interpolation to calculate the coordinates of the corresponding points and sample texture rendering. The above processes may be repeated to complete rendering of a whole latest face image, further to obtain the second target face image.

In summary, with the method for synthesizing the figure of the virtual object in the embodiments of the disclosure, on one hand, the posture of the original face image is adjusted based on the figure image of the virtual object corresponding to the face of the virtual object, to avoid the naturalness of the synthesized image, on the other hand, the original face image is adjusted based on the 3D posture of the face of the virtual object, to avoid deformity of the synthesized image.

When the figure image of the virtual object and each target face image are synthesized directly based on the above embodiments, there may be obvious boundary between the texture of the target face image and the original texture of the virtual object. Therefore, both textures need to be fused.

Figure 10:
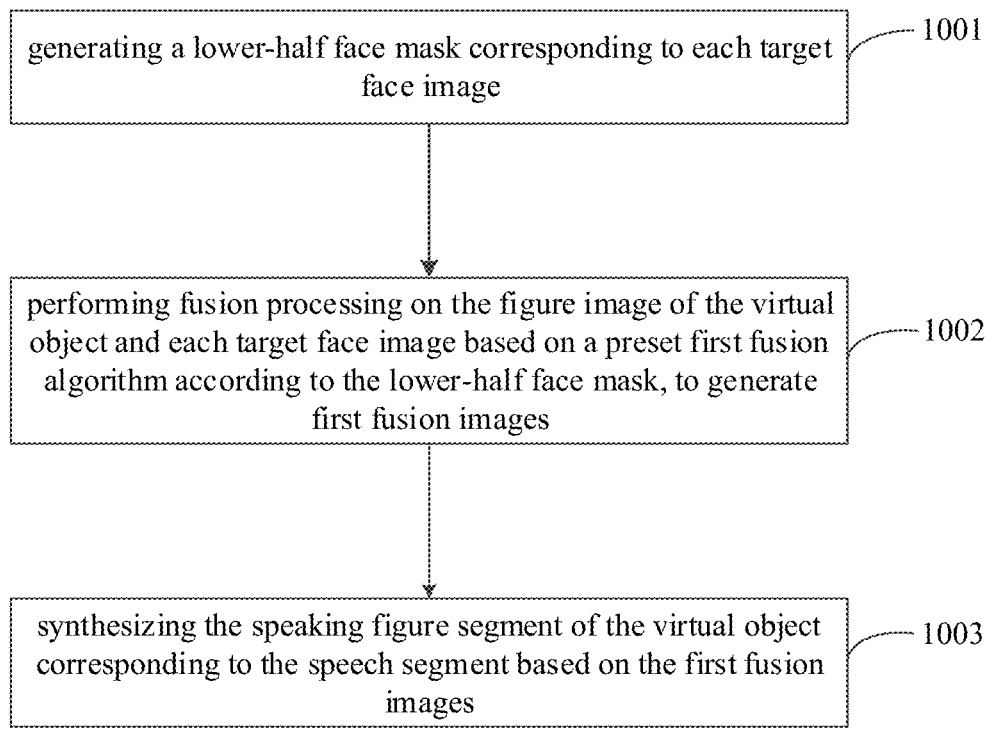
FIG. 10 is a flowchart illustrating a method for synthesizing a figure of a virtual object according to a tenth embodiment of the disclosure.

In some embodiments of the disclosure, as illustrated in FIG. 10, synthesizing the speaking figure segment of the virtual object, corresponding to the speech segment, based on the figure image of the virtual object and each target face image may include the following.

At block 1001, a lower-half face mask corresponding to each target face image is generated.

In some embodiments, the lower-half face mask corresponding to each target face image is generated to ensure the retain of the mouth image of each target face image.

In some embodiments of the disclosure, edge detection is performed on each target face image to obtain face edge points, the face edge points are connected to form a closed region, and a fixed value is filled in the closed region to generate a full face mask. The fixed value may be any pixel value, for example, "1". The lower-half face mask is intercepted from the full face mask by taking a central key point of a nose bridge as reference. The central key point of the nose bridge may be understood as the central point of the region of the tip of nose.

At block 1002, fusion processing is performed on the figure image of the virtual object and each target face image based on a preset first fusion algorithm according to the lower-half face mask, to generate first fusion images.

In some embodiments, the fusion processing is performed on the figure image of the virtual object and each target face image based on the preset first fusion algorithm according to the lower-half face mask, to generate a plurality of first fusion images, in which the first fusion algorithm may be a Poisson fusion algorithm, an Alpha algorithm, etc., which will not be limited herein.

At block 1003, the speaking figure segment of the virtual object corresponding to the speech segment is synthesized based on the first fusion images.

Since the lower-half face region in the first fusion image is fused based on the lower-half face mask, the contour information of the lower-half face in the target face image is retained. The first fusion algorithm may achieve texture fusion of the target face image and the figure image of the virtual object, and the speaking figure segment of the virtual object corresponding to the speech segment is synthesized based on the plurality of first fusion images, which not only retains mouth information of the target face image, but also the synthesized texture boundary is not obvious and fusion effect is natural.

In order to further improve the naturalness of fusion, in some embodiments of the disclosure, after the first fusion image corresponding to each target face image is generated, a mouth region mask corresponding to each target face image is generated, in which, key points of an outer edge of a mouth of each target face image may be extracted, the key points of the outer edge of the mouth may be connected to form a closed region and a fixed value may be filled with the closed region to generate an initial mask (the fixed value may be 1), and Gaussian filtering is performed on the initial mask to obtain the mouth region mask corresponding to each target face image.

Further, fusion processing is performed on the figure image of the virtual object and each first fusion image based on a preset second fusion algorithm according to the mouth region mask, to generate second fusion images, in which the second fusion algorithm may be a Poisson fusion algorithm, an Alpha algorithm, etc., which will not be limited herein.

The speaking figure segment of the virtual object corresponding to the speech segment is synthesized based on the second fusion images.

Since the mouth region in the second fusion image is fused based on the mouth region mask, the contour information of the mouth in the target face image is retained. The second fusion algorithm may achieve texture fusion of the target face image and the figure image of the virtual object, and the speaking figure segment of the virtual object corresponding to the speech segment is synthesized based on the second fusion images, which not only retains mouth information of the target face image, but also fuses both textures and enhances display effect after fusion.

In order to make those skilled in the art understand the method for synthesizing the figure of the virtual object provided in the disclosure more clearly, it will be described in combination with a specific scenario. In the scenario, the first fusion algorithm is a Poisson fusion algorithm and the second fusion algorithm is an Alpha algorithm.

Figure 11:
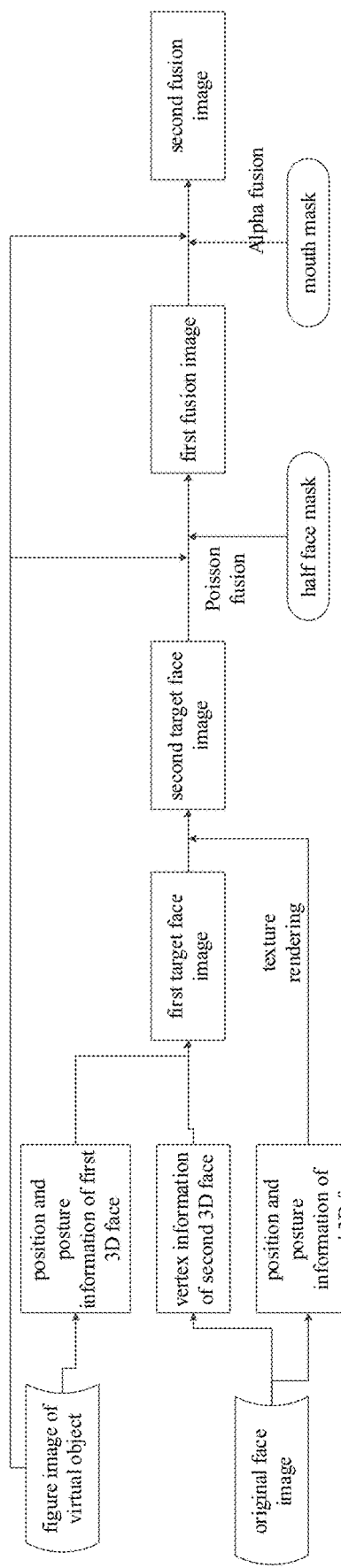
FIG. 11 is a flowchart illustrating a method for synthesizing a figure of a virtual object according to an eleventh embodiment of the disclosure.

Referring to FIG. 11 (taking one original face image as an example in FIG. 11), the position and the posture information of the first 3D face corresponding to the face of the virtual object in the figure image of the virtual object, the vertex information of the second 3D face of the original face image, and the position and the posture information of the second 3D face are obtained.

Further, projection transformation is performed on the vertex information of the second 3D face based on the position and the posture information of the first 3D face and the vertex information of the second 3D face, to generate the first target face image corresponding to each original face image, and the generated first target face image is a 2D image.

After the 2D image is obtained, texture rendering is performed on the first target face image based on the position and posture information of the second 3D face, to obtain the second target face image. First, Poisson fusion is performed on the second target face image and the figure image of the virtual object based on the half-face mask, to generate the first fusion image. Alpha fusion is performed on the first fusion image and the figure image of the virtual object based on the mouth mask to obtain the second fusion image, which may be taken as the final fusion image. The speaking figure segment of the virtual object corresponding to the speech segment is obtained based on the second fusion images.

In summary, with the method for synthesizing the figure of the virtual object provided in the embodiments of the disclosure, when the figure image of the virtual object and each target face image are fused, the retain of the mouth shape of each target face image and the fused texture naturalness are taken into consideration, and the naturalness of the fused image is guaranteed.

Figure 12:
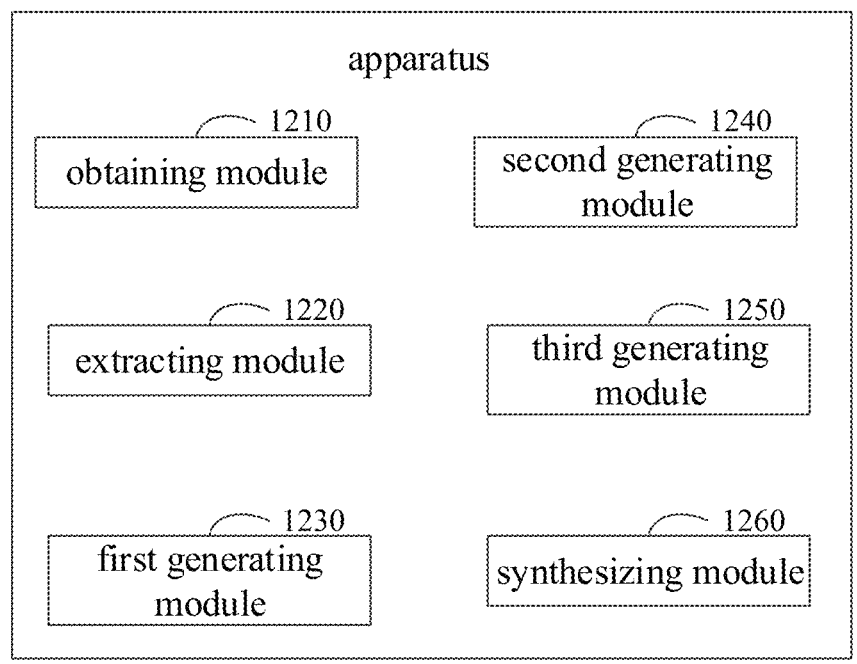
FIG. 12 is a block diagram illustrating an apparatus for synthesizing a figure of a virtual object according to a twelfth embodiment of the disclosure.

To achieve the above embodiments, the disclosure further proposes an apparatus for synthesizing a figured of a virtual object. FIG. 12 is a block diagram illustrating an apparatus for synthesizing a figured of a virtual object according to some embodiments of the disclosure. As illustrated in FIG. 12, the apparatus includes an obtaining module 1210, an extracting module 1220, a first generating module 1230, a second generating module 1240, a third generating module 1250, and a synthesizing module 1260.

The obtaining image 1220 is configured to obtain a figure image of the virtual object, and original face images corresponding to a speech segment, in which the figure image includes a face of the virtual object.

The extracting module 1220 is configured to extract a first face key point of the face of the virtual object, and a second face key point of each of the original face images.

The first generating module 1230 is configured to process the first face key point based on a preset algorithm, to generate a position and posture information of a first three-dimensional 3D face corresponding to the face of the virtual object.

The second generating module 1240 is configured to process each second face key point based on a preset algorithm, to generate vertex information of a second 3D face corresponding to each original face image.

The third generating module 1250 is configured to generate a target face image corresponding to each original face image based on the position and the posture information of the first 3D face and the vertex information of each second 3D face.

The synthesizing module 1260 is configured to synthesize a speaking figure segment of the virtual object, corresponding to the speech segment, based on the figure image of the virtual object and each target face image.

In some embodiments, the first generating module 1230 is configured to: perform coordinate transformation processing on the first face key point based on a preset transformation parameter, to generate a first 3D face mesh model; and extract the position and the posture information of the first 3D face corresponding to the face of the virtual object from the first 3D face mesh model, in which, the posture information includes a pitch angle, a yaw angle, and a roll angle.

In some embodiments, the second generating module 1240 is configured to: perform coordinate transformation processing on each second face key point based on a preset transformation parameter, to generate a second 3D face mesh model corresponding to each original face image; and extract the vertex information of the second 3D face from each second 3D face mesh model.

It should be noted that the foregoing explanation of the method embodiments may also be applicable to the apparatus in some embodiments, of which the implementation principle is similar, which will not be repeated herein.

In summary, with the apparatus for synthesizing the figure image of the virtual object provided in embodiments of the disclosure, the figure image of the virtual object and the original face images corresponding to the speech segment may be obtained, in which the figure image includes the face of the virtual object. The first face key point of the face of the virtual object and the second face key point of each of the original face images may be extracted. The first face key point may be processed based on the preset algorithm, to generate the position and the posture information of the first 3D face corresponding to the face of the virtual object. Each second face key point may be processed based on the preset algorithm, to generate the vertex information of the second 3D face corresponding to each original face image. The target face image corresponding to each original face image may be generated based on the position and the posture information of the first 3D face and the vertex information of each second 3D face. The speaking figure segment of the virtual object, corresponding to the speech segment, may be synthesized based on the figure image of the virtual object and each target face image. Therefore, the original face images may be adjusted to be under the posture and position of the figure of the virtual object for fusion, to improve a naturalness of the fusion images, and make the fusion images to truly restore the speaking figure of the original face images.

It should be understood that, the target face image restores the posture and position of the face of the virtual object. For example, the face of the virtual object is an aslant head, whatever posture of the face in the original face image is, it may be transformed to the target face image corresponding to the same aslant head.

In different application scenarios, generating the target face image corresponding to each original face image based on the position and the posture information of the first 3D face and the vertex information of each second 3D face may be different.

In some embodiments, the third generating module 1250 is configured to: perform projection transformation on the position and the posture information of the first 3D face and the vertex information of each second 3D face respectively based on a preset transformation algorithm, to generate a first target face image corresponding to each original face image.

Figure 13:
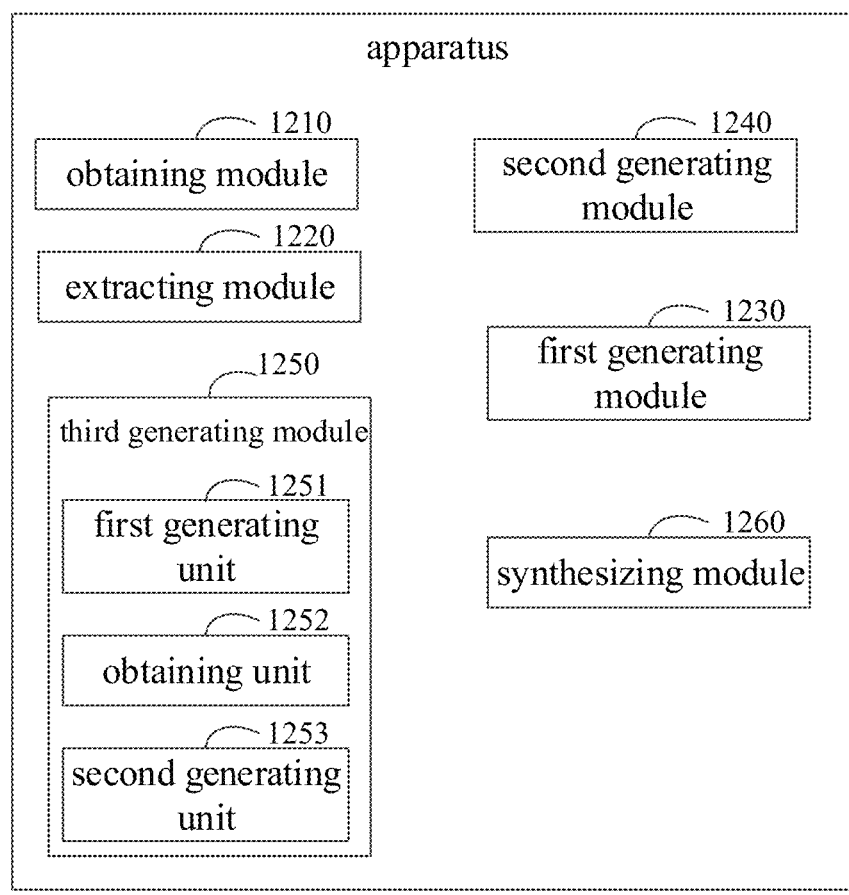
FIG. 13 is a block diagram illustrating an apparatus for synthesizing a figure of a virtual object according to a thirteenth embodiment of the disclosure.

In some embodiments, as illustrated in FIG. 13, on the basis of FIG. 12, the third generating module 1250 includes a first generating unit 1251, an obtaining unit 1252, and a second generating unit 1253.

The first generating unit 1251 is configured to process each second face key point based on a preset algorithm, to generate a position and posture information of the second 3D face corresponding to each original face image.

The obtaining unit 1252 is configured to obtain texture information of a position corresponding to the position and the posture information of the second 3D face from each original face image based on a preset projection transformation algorithm.

The second generating unit 1253 is configured to perform texture rendering on each first target face image based on the texture information of the corresponding position, to generate a second target face image corresponding to each original face image.

It should be noted that the foregoing explanation of the method embodiments may also be applicable to the apparatus in some embodiments, of which the implementation principle is similar, which will not be repeated herein.

In summary, with the apparatus for synthesizing the figure image of the virtual object provided in embodiments of the disclosure, on one hand, the posture of the original face image is adjusted based on the figure image of the virtual object corresponding to the face of the virtual object, to avoid the naturalness of the synthesized image, on the other hand, the original face image is adjusted based on the 3D posture of the face of the virtual object, to avoid deformity of the synthesized image.

When the figure image of the virtual object and each target face image are synthesized directly based on the above embodiments, there may be obvious boundary between the texture of the target face image and the original texture of the virtual object. Therefore, both textures need to be fused.

Figure 14:
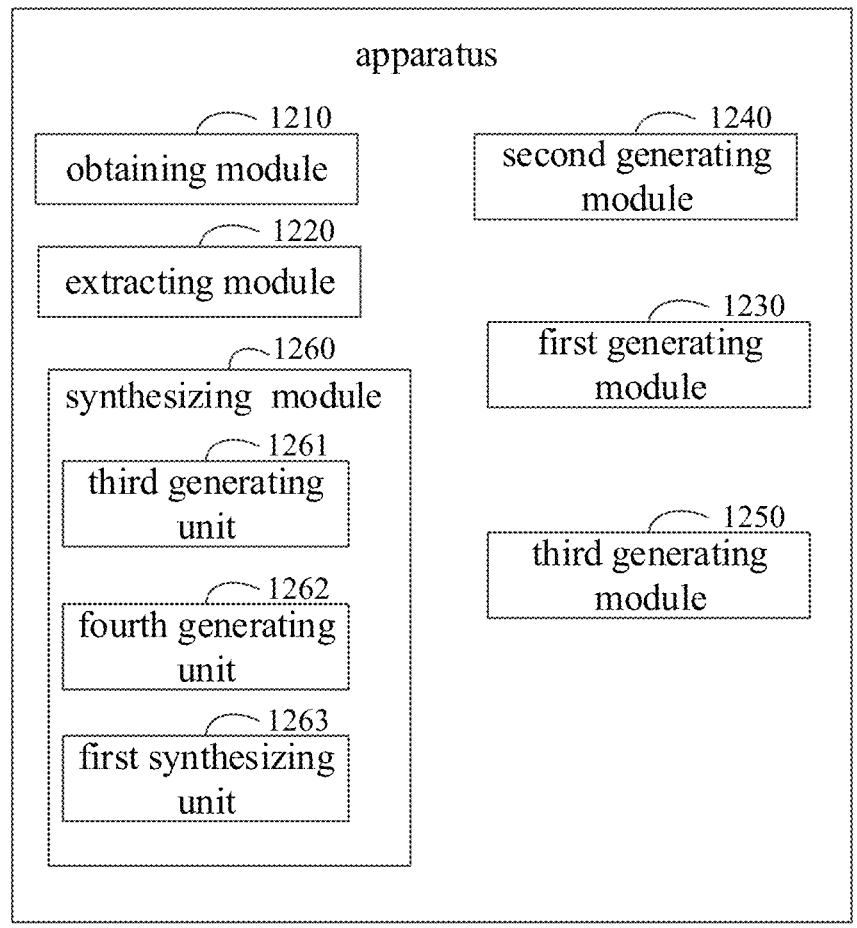
FIG. 14 is a block diagram illustrating an apparatus for synthesizing a figure of a virtual object according to a fourteenth embodiment of the disclosure.

In some embodiments, as illustrated in FIG. 14, on the basis of FIG. 12, the synthesizing module 1260 includes a third generating unit 1261, a fourth generating unit 1262, and a first synthesizing unit 1263.

The third generating unit 1261 is configured to generate a lower-half face mask corresponding to each target face image.

The fourth generating unit 1262 is configured to perform fusion processing on the figure image of the virtual object and each target face image based on a preset first fusion algorithm according to the lower-half face mask, to generate first fusion images.

The first synthesizing unit 1263 is configured to synthesize the speaking figure segment of the virtual object corresponding to the speech segment based on the first fusion images.

In some embodiments, the third generating unit is configured to: perform edge detection on each target face image to obtain face edge points; connect the face edge points to form a closed region and fill a fixed value with the closed region to generate a full face mask; and intercept the lower-half face mask from the full face mask by taking a central key point of a nose bridge as reference.

Figure 15:
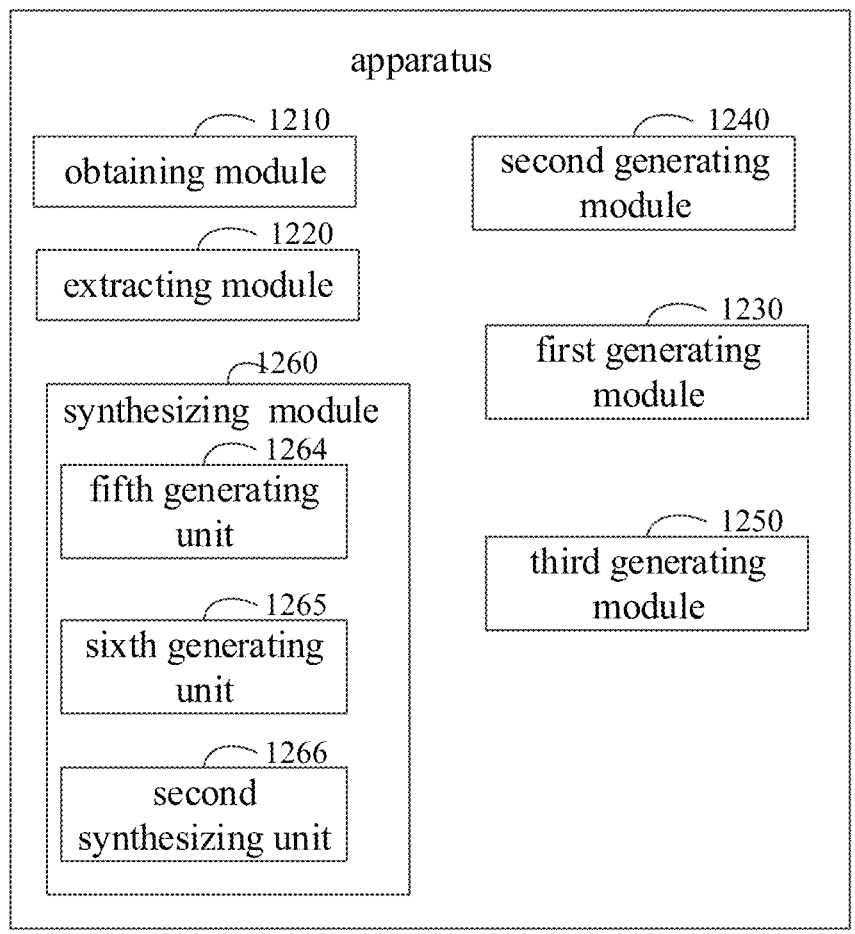
FIG. 15 is a block diagram illustrating an apparatus for synthesizing a figure of a virtual object according to a fifteenth embodiment of the disclosure.

In some embodiments, as illustrated in FIG. 15, on the basis of FIG. 12, the synthesizing module 1260 includes a fifth generating unit 1264, a sixth generating unit 1265, and a second synthesizing unit 1266.

The fifth generating unit 1264 is configured to generate a mouth region mask corresponding to each target face image.

The sixth generating unit 1265 is configured to perform fusion processing on the figure image of the virtual object and each first fusion image based on a preset second fusion algorithm according to the mouth region mask, to generate second fusion images.

The second synthesizing unit 1266 is configured to synthesize the speaking figure segment of the virtual object corresponding to the speech segment based on the second fusion images.

In some embodiments, the fifth generating unit 1266 is configured to: extract key points of an outer edge of a mouth of each target face image; connect the key points of the outer edge of the mouth to form a closed region and fill a fixed value with the closed region to generate an initial mask; and perform Gaussian filtering on the initial mask to obtain the mouth region mask corresponding to each target face image.

It should be noted that the foregoing explanation of the method embodiments may also be applicable to the apparatus in some embodiments, of which the implementation principle is similar, which will not be repeated herein.

In summary, with the apparatus for synthesizing the figure image of the virtual object provided in embodiments of the disclosure, when the figure image of the virtual object and each target face image are fused, the retain of the mouth shape of each target face image and the fused texture naturalness are taken into consideration, and the naturalness of the fused image is guaranteed.

An electronic device and a readable storage medium are further provided according to embodiments of the disclosure.

Figure 16:
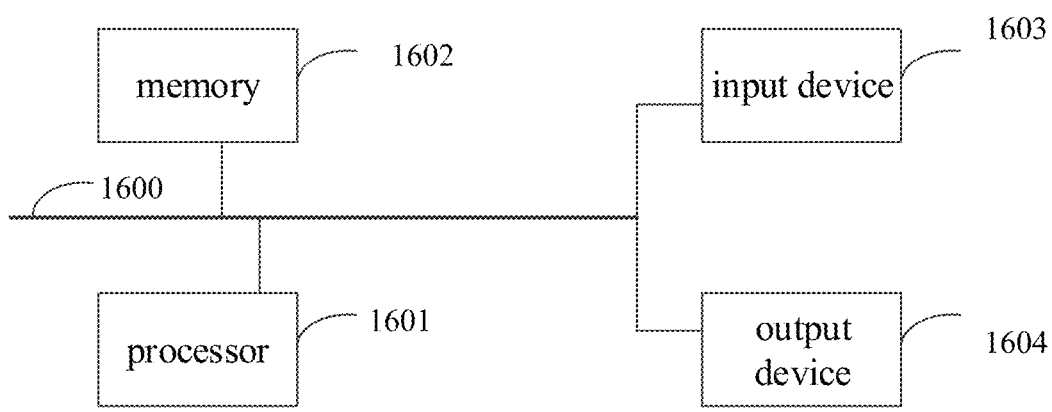
FIG. 16 is a block diagram illustrating an electronic device for implementing a method for synthesizing a figure of a virtual object in some embodiments of the disclosure.

FIG. 16 is a block diagram illustrating an electronic device for implementing a method for synthesizing a figure of a virtual object according to some embodiments of the disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the disclosure described and/or required herein.

As illustrated in FIG. 16, the electronic device includes: one or more processors 1601, a memory 1602, and interfaces for connecting various components, including a high-speed interface and a low-speed interface. The various components are interconnected using different buses and can be mounted on a common mainboard or otherwise installed as required. The processor may process instructions executed within the electronic device, including instructions stored in or on the memory to display graphical information of the GUI on an external input/output device such as a display device coupled to the interface. In other embodiments, a plurality of processors and/or buses can be used with a plurality of memories and processors, if desired. Similarly, a plurality of electronic devices can be connected, each providing some of the necessary operations (for example, as a server array, a group of blade servers, or a multiprocessor system). A processor 1601 is taken as an example in FIG. 16.

The memory 1602 is a non-transitory computer-readable storage medium according to the disclosure. The memory stores instructions executable by at least one processor, so that the at least one processor executes the method according to the disclosure. The non-transitory computer-readable storage medium of the disclosure stores computer instructions, which are used to cause a computer to execute the method according to the disclosure.

As a non-transitory computer-readable storage medium, the memory 1602 is configured to store non-transitory software programs, non-transitory computer executable programs and modules, such as program instructions/modules corresponding to the method in the embodiment of the disclosure. The processor 1601 executes various functional applications and data processing of the server by running non-transitory software programs, instructions, and modules stored in the memory 1602, that is, implementing the method in the foregoing method embodiments.

The memory 1602 may include a storage program area and a storage data area, where the storage program area may store an operating system and application programs required for at least one function. The storage data area may store data created according to the use of the electronic device for implementing the method. In addition, the memory 1602 may include a high-speed random access memory, and a non-transitory memory, such as at least one magnetic disk storage device, a flash memory device, or other non-transitory solid-state storage device. In some embodiments, the memory 1602 may optionally include a memory remotely disposed with respect to the processor 1601, and these remote memories may be connected to the electronic device for implementing the method through a network. Examples of the above network include, but are not limited to, the Internet, an intranet, a local area network, a mobile communication network, and combinations thereof.

The electronic device for implementing the method may further include: an input device 1603 and an output device 1604. The processor 1601, the memory 1602, the input device 1603, and the output device 1604 may be connected through a bus or in other manners. In FIG. 16, the connection through the bus is taken as an example.

The input device 1603 may receive inputted numeric or character information, and generate key signal inputs related to user settings and function control of an electronic device for implementing the method, such as a touch screen, a keypad, a mouse, a trackpad, a touchpad, an indication rod, one or more mouse buttons, trackballs, joysticks and other input devices. The output device 1604 may include a display device, an auxiliary lighting device (for example, an LED), a haptic feedback device (for example, a vibration motor), and the like. The display device may include, but is not limited to, a liquid crystal display (LCD), a light emitting diode (LED) display, and a plasma display. In some embodiments, the display device may be a touch screen.

Various embodiments of the systems and technologies described herein may be implemented in digital electronic circuit systems, integrated circuit systems, application specific integrated circuits (ASICs), computer hardware, firmware, software, and/or combinations thereof. These various embodiments may be implemented in one or more computer programs, which may be executed and/or interpreted on a programmable system including at least one programmable processor. The programmable processor may be dedicated or general purpose programmable processor that receives data and instructions from a storage system, at least one input device, and at least one output device, and transmits the data and instructions to the storage system, the at least one input device, and the at least one output device.

These computing programs (also known as programs, software, software applications, or code) include machine instructions of a programmable processor and may utilize high-level processes and/or object-oriented programming languages, and/or assembly/machine languages to implement these calculation procedures. As used herein, the terms "machine-readable medium" and "computer-readable medium" refer to any computer program product, device, and/or device used to provide machine instructions and/or data to a programmable processor (for example, magnetic disks, optical disks, memories, programmable logic devices (PLDs), including machine-readable media that receive machine instructions as machine-readable signals. The term "machine-readable signal" refers to any signal used to provide machine instructions and/or data to a programmable processor.

In order to provide interaction with a user, the systems and techniques described herein may be implemented on a computer having a display device (e.g., a Cathode Ray Tube (CRT) or a Liquid Crystal Display (LCD) monitor for displaying information to a user); and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, sound input, or tactile input).

The systems and technologies described herein can be implemented in a computing system that includes background components (for example, a data server), or a computing system that includes middleware components (for example, an application server), or a computing system that includes front-end components (For example, a user computer with a graphical user interface or a web browser, through which the user can interact with the implementation of the systems and technologies described herein), or include such background components, intermediate computing components, or any combination of front-end components. The components of the system may be interconnected by any form or medium of digital data communication (e.g., a communication network). Examples of communication networks include: local area network (LAN), wide area network (WAN), and the Internet.

The computer system may include a client and a server. The client and server are generally remote from each other and interacting through a communication network. The client-server relation is generated by computer programs running on the respective computers and having a client-server relation with each other.

According to the embodiments of the disclosure, the figure image of the virtual object and the original face images corresponding to the speech segment may be obtained, in which the figure image includes the face of the virtual object. The first face key point of the face of the virtual object and the second face key point of each of the original face images may be extracted. The first face key point may be processed based on the preset algorithm, to generate the position and the posture information of the first 3D face corresponding to the face of the virtual object. Each second face key point may be processed based on the preset algorithm, to generate the vertex information of the second 3D face corresponding to each original face image. The target face image corresponding to each original face image may be generated based on the position and the posture information of the first 3D face and the vertex information of each second 3D face. The speaking figure segment of the virtual object, corresponding to the speech segment, may be synthesized based on the figure image of the virtual object and each target face image. Therefore, the original face images may be adjusted to be under the posture and position of the figure of the virtual object for fusion, to improve a naturalness of the fusion images, and make the fusion images to truly restore the speaking figure of the original face images.

It should be understood that various forms of processes shown above may be used to reorder, add, or delete steps. For example, the steps described in the disclosure may be performed in parallel, sequentially, or in different orders. As long as the desired results of the technical solutions disclosed in the disclosure can be achieved, no limitation is made herein.

The above specific embodiments do not constitute a limitation on the protection scope of the disclosure. Those skilled in the art should understand that various modifications, combinations, sub-combinations and substitutions can be made according to design requirements and other factors. Any modification, equivalent replacement and improvement made within the spirit and principle of this application shall be included in the protection scope of this application.

The invention claimed is:

1. A method for synthesizing a figure of a virtual object, comprising:
    obtaining a figure image of the virtual object, and original face images corresponding to a speech segment, in which the figure image comprises a face of the virtual object;
    extracting a first face key point of the face of the virtual object, and a second face key point of each of the original face images;
    processing the first face key point based on a preset algorithm, to generate a position and posture information of a first three-dimensional 3D face corresponding to the face of the virtual object;
    processing each second face key point based on a preset algorithm, to generate vertex information of a second 3D face corresponding to each original face image;
    generating a target face image corresponding to each original face image based on the position and the posture information of the first 3D face and the vertex information of each second 3D face; and
    synthesizing a speaking figure segment of the virtual object, corresponding to the speech segment, based on the figure image of the virtual object and each target face image.

2. The method of claim 1, wherein, processing the first face key point based on the preset algorithm, to generate the position and the posture information of the first 3D face corresponding to the face of the virtual object, comprises:
    performing coordinate transformation processing on the first face key point based on a preset transformation parameter, to generate a first 3D face mesh model; and
    extracting the position and the posture information of the first 3D face corresponding to the face of the virtual object from the first 3D face mesh model, in which, the posture information comprises a pitch angle, a yaw angle, and a roll angle.

3. The method of claim 1, wherein, processing each second face key point based on the preset algorithm, to generate the vertex information of the second 3D face corresponding to each original face image, comprises:
    performing coordinate transformation processing on each second face key point based on a preset transformation parameter, to generate a second 3D face mesh model corresponding to each original face image; and
    extracting the vertex information of the second 3D face from each second 3D face mesh model.

4. The method of claim 1, wherein, generating the target face image corresponding to each original face image based on the position and the posture information of the first 3D face and the vertex information of each second 3D face, comprises:
    performing projection transformation on the position and the posture information of the first 3D face and the vertex information of each second 3D face respectively based on a preset transformation algorithm, to generate a first target face image corresponding to each original face image.

5. The method of claim 4, after the first target face image corresponding to each original face image is generated, further comprising:
    processing each second face key point based on a preset algorithm, to generate a position and posture information of the second 3D face corresponding to each original face image;
    obtaining texture information of a position corresponding to the position and the posture information of the second 3D face from each original face image based on a preset projection transformation algorithm; and
    performing texture rendering on each first target face image based on the texture information of the corresponding position, to generate a second target face image corresponding to each original face image.

6. The method of claim 1, wherein, synthesizing the speaking figure segment of the virtual object, corresponding to the speech segment, based on the figure image of the virtual object and each target face image, comprises:
    generating a lower-half face mask corresponding to each target face image;
    performing fusion processing on the figure image of the virtual object and each target face image based on a preset first fusion algorithm according to the lower-half face mask, to generate first fusion images; and synthesizing the speaking figure segment of the virtual object corresponding to the speech segment based on the first fusion images.

7. The method of claim 6, wherein, generating the lower-half face mask corresponding to each target face image, comprises:
   performing edge detection on each target face image to obtain face edge points;
   connecting the face edge points to form a closed region and filling a fixed value with the closed region to generate a full face mask; and
   intercepting the lower-half face mask from the full face mask by taking a central key point of a nose bridge as reference.

8. The method of claim 6, wherein, after the first fusion image corresponding to each original face image is generated, further comprises:
   generating a mouth region mask corresponding to each target face image;
   performing fusion processing on the figure image of the virtual object and each first fusion image based on a preset second fusion algorithm according to the mouth region mask, to generate second fusion images; and
   synthesizing the speaking figure segment of the virtual object corresponding to the speech segment based on the second fusion images.

9. The method of claim 8, wherein, generating the mouth region mask corresponding to each target face image, comprises:
   extracting key points of an outer edge of a mouth of each target face image;
   connecting the key points of the outer edge of the mouth to form a closed region and filling a fixed value with the closed region to generate an initial mask; and
   performing Gaussian filtering on the initial mask to obtain the mouth region mask corresponding to each target face image.

10. An electronic device, comprising:
    at least one processor; and
    a memory communicatively coupled to the at least one processor; wherein,
    the memory is configured to store instructions executable by the at least one processor, and when the instructions are executed by the at least one processor, the at least one processor is caused to perform:
    obtaining a figure image of a virtual object, and original face images corresponding to a speech segment, in which the figure image comprises a face of the virtual object;
    extracting a first face key point of the face of the virtual object, and a second face key point of each of the original face images;
    processing the first face key point based on a preset algorithm, to generate a position and posture information of a first three-dimensional 3D face corresponding to the face of the virtual object;
    processing each second face key point based on a preset algorithm, to generate vertex information of a second 3D face corresponding to each original face image;
    generating a target face image corresponding to each original face image based on the position and the posture information of the first 3D face and the vertex information of each second 3D face; and
    synthesizing a speaking figure segment of the virtual object, corresponding to the speech segment, based on the figure image of the virtual object and each target face image.

11. The device of claim 10, wherein, processing the first face key point based on the preset algorithm, to generate the position and the posture information of the first 3D face corresponding to the face of the virtual object, comprises:
    performing coordinate transformation processing on the first face key point based on a preset transformation parameter, to generate a first 3D face mesh model; and
    extracting the position and the posture information of the first 3D face corresponding to the face of the virtual object from the first 3D face mesh model, in which, the posture information comprises a pitch angle, a yaw angle, and a roll angle.

12. The device of claim 10, wherein, processing each second face key point based on the preset algorithm, to generate the vertex information of the second 3D face corresponding to each original face image, comprises:
    performing coordinate transformation processing on each second face key point based on a preset transformation parameter, to generate a second 3D face mesh model corresponding to each original face image; and
    extracting the vertex information of the second 3D face from each second 3D face mesh model.

13. The device of claim 10, wherein, generating the target face image corresponding to each original face image based on the position and the posture information of the first 3D face and the vertex information of each second 3D face, comprises:
    performing projection transformation on the position and the posture information of the first 3D face and the vertex information of each second 3D face respectively based on a preset transformation algorithm, to generate a first target face image corresponding to each original face image.

14. The device of claim 13, wherein when the instructions are executed by the at least one processor, the at least one processor is caused to perform:
    after the first target face image corresponding to each original face image is generated, processing each second face key point based on a preset algorithm, to generate a position and posture information of the second 3D face corresponding to each original face image;
    obtaining texture information of a position corresponding to the position and the posture information of the second 3D face from each original face image based on a preset projection transformation algorithm; and
    performing texture rendering on each first target face image based on the texture information of the corresponding position, to generate a second target face image corresponding to each original face image.

15. The device of claim 10, wherein, synthesizing the speaking figure segment of the virtual object, corresponding to the speech segment, based on the figure image of the virtual object and each target face image, comprises:
    generating a lower-half face mask corresponding to each target face image;
    performing fusion processing on the figure image of the virtual object and each target face image based on a preset first fusion algorithm according to the lower-half face mask, to generate first fusion images; and
    synthesizing the speaking figure segment of the virtual object corresponding to the speech segment based on the first fusion images.

16. The device of claim 15, wherein, generating the lower-half face mask corresponding to each target face image, comprises:

performing edge detection on each target face image to obtain face edge points;

connecting the face edge points to form a closed region and filling a fixed value with the closed region to generate a full face mask; and intercepting the lower-half face mask from the full face mask by taking a central key point of a nose bridge as reference.

17. The device of claim 15, wherein when the instructions are executed by the at least one processor, the at least one processor is caused to perform:

after the first fusion image corresponding to each original face image is generated, generating a mouth region mask corresponding to each target face image;

performing fusion processing on the figure image of the virtual object and each first fusion image based on a preset second fusion algorithm according to the mouth region mask, to generate second fusion images; and synthesizing the speaking figure segment of the virtual object corresponding to the speech segment based on the second fusion images.

18. The device of claim 17, wherein, generating the mouth region mask corresponding to each target face image, comprises:

extracting key points of an outer edge of a mouth of each target face image;

connecting the key points of the outer edge of the mouth to form a closed region and filling a fixed value with the closed region to generate an initial mask; and performing Gaussian filtering on the initial mask to obtain the mouth region mask corresponding to each target face image.

19. A non-transitory computer-readable storage medium storing computer instructions, wherein the computer instructions are configured to enable a computer to perform a method for synthesizing a figure of a virtual object, the method comprising:

obtaining a figure image of the virtual object, and original face images corresponding to a speech segment, in which the figure image comprises a face of the virtual object;

extracting a first face key point of the face of the virtual object, and a second face key point of each of the original face images;

processing the first face key point based on a preset algorithm, to generate a position and posture information of a first three-dimensional 3D face corresponding to the face of the virtual object;

processing each second face key point based on a preset algorithm, to generate vertex information of a second 3D face corresponding to each original face image;

generating a target face image corresponding to each original face image based on the position and the posture information of the first 3D face and the vertex information of each second 3D face; and synthesizing a speaking figure segment of the virtual object, corresponding to the speech segment, based on the figure image of the virtual object and each target face image.

20. The non-transitory computer-readable storage medium of claim 19, wherein, generating the target face image corresponding to each original face image based on the position and the posture information of the first 3D face and the vertex information of each second 3D face, comprises:

performing projection transformation on the position and the posture information of the first 3D face and the vertex information of each second 3D face respectively based on a preset transformation algorithm, to generate a first target face image corresponding to each original face image.

* * * * *